US006453936B1

(12) United States Patent
Frank et al.

(10) Patent No.: US 6,453,936 B1
(45) Date of Patent: Sep. 24, 2002

(54) VALVE SYSTEM FOR THE PRE-ENGAGEMENT UNIT OF A BRAKING PRESSURE MODULATOR

(75) Inventors: Dieter Frank, Hannover (DE); Gerdt Schreibert, Isernhagen (DE); Peter Homann, Neustadt (DE); Armin Sieker, Bielefeld (DE); Andreas Kranz, Wunstorf (DE); Hans-Klaus Wolff, Springe (DE); Dirk Meier, Seelze (DE)

(73) Assignee: WABCO GmbH & Co. oHG, Hannover (DE)

( * ) Notice: Subject to any disclaimer, the term of this patent is extended or adjusted under 35 U.S.C. 154(b) by 0 days.

(21) Appl. No.: 09/792,434

(22) Filed: Feb. 23, 2001

(30) Foreign Application Priority Data

Feb. 26, 2000 (DE) ........................................ 100 09 116

(51) Int. Cl.[7] ......................... F15B 13/044; F16K 31/06

(52) U.S. Cl. ............................ 137/315.03; 137/315.11; 137/596.17; 137/625.65; 251/129.02; 251/129.15; 251/129.21; 251/303; 251/118.1

(58) Field of Search ....................... 137/315.03, 315.11, 137/596.17, 625.65; 251/129.02, 129.15, 129.21; 303/118.1

(56) References Cited

U.S. PATENT DOCUMENTS

| | | | |
|---|---|---|---|
| 4,102,526 A | 7/1978 | Hargraves | |
| 4,245,815 A | 1/1981 | Willis | |
| 5,127,434 A | 7/1992 | Kline et al. | |
| 5,577,322 A | 11/1996 | Ohshita et al. | |
| 5,823,507 A | 10/1998 | Inden et al. | |
| 5,845,672 A | 12/1998 | Reuter et al. | |
| 6,206,481 B1 * | 3/2001 | Kaisers et al. | 303/118.1 X |

FOREIGN PATENT DOCUMENTS

| | | |
|---|---|---|
| DE | 27 57 803 | 6/1979 |
| DE | 33 08 279 | 9/1984 |
| DE | 42 27 084 | 2/1994 |
| DE | 195 04 883 | 11/1996 |
| DE | 196 09 222 | 9/1997 |
| DE | 199 18 070 | 12/1999 |
| DE | 196 36 432 | 6/2000 |
| DE | 197 30 276 | 8/2000 |
| EP | 0 499 670 | 8/1992 |
| EP | 0 893 636 | 1/1999 |
| EP | 0 837 274 | 8/1999 |
| WO | WO 99/51901 | 10/1999 |

* cited by examiner

*Primary Examiner*—Gerald A. Michalsky
(74) *Attorney, Agent, or Firm*—Proskauer Rose LLP

(57) ABSTRACT

A valve system for the pre-engagement unit of a vehicle braking pressure modulator contains solenoid valves, which are controlled by an electronic braking system. Pneumatic pressure is fed into a brake cylinder on the vehicle wheels via a pressure regulating channel of the pre-engagement unit. The solenoid valves are configured as cartridge solenoid valves, so that assembly is simplified, and utilization of elastic tolerance compensating elements is unnecessary. A preferred embodiment includes three cylinder bodies connected end-to-end with no increase in cylinder diameter. This embodiment enables the use of identical armatures and identical magnet coils for different valve types, such as 3/2-way solenoid valves or 2/2-way solenoid valves. Also, these valves may be configured as normally open or normally closed, with identical outside dimensions. As such, three cartridge solenoid valves can be combined into a compact triple valve cartridge unit that further simplifies the assembly process.

33 Claims, 12 Drawing Sheets

2/2-WAY VALVE NORMALLY CLOSED

2/2-WAY VALVE NORMALLY OPEN

3/2-WAY VALVE 60
68
65
80
82
72
63
85
35
37
31
40
41
71
70
39
36
38
61
69
50
83
78
79
75
86
76
87
77
88
66
81
84
62
64

60
68
65
80
72
63
35
75
86
83
32
78
40
41
71
76
70
39
79
36
38
87
77
61
69
50
88
66
81
84
62
64

VALVE SYSTEM FOR THE PRE-ENGAGEMENT UNIT OF A BRAKING PRESSURE MODULATOR

BACKGROUND OF THE INVENTION

The invention relates to a valve system for the pre-engagement unit of a braking pressure modulator.

European patent application A1-0 893 636 discloses a hydraulic solenoid valve, which utilizes an elastic means to compensate for mechanical tolerances and heat expansion.

This known patent application shows a valve cartridge 1 in FIG. 1 which contains the elements of mechanical actuation. This valve cartridge is inserted into an opening of another component, which contains a magnet coil 13.

When current flows in the magnet coil (13), a magnetic field is created in the closed magnetic circuit, consisting of the parts referenced in FIG. 1 as 14, 2, 7 and 9. This magnetic field causes a force to be exerted upon a core 9 constructed in the form of an armature. This force also acts, via a ram 16 connected to the core, upon a ball 17 which is not connected to the ram 16. The ball 17 is lifted up against the force of a spring 22 from its sealing seat 18 causing the sealing seat 18 to be opened. (When there is no current flowing in magnet coil 13, ram 16 is held lightly, via a fixing spring, on the ball 17, as explained below, whereas spring 22 is significantly stronger).

When sealing seat 18 is opened, the connecting channel between the hydraulic inlet (therein 20) and the hydraulic output terminal (therein 21) is opened. Therefore, the known solenoid valve can be described as a normally closed 2/2-way solenoid valve.

Since the known solenoid valve is made up of several separate parts, a number of different work steps are required in order to assemble it.

As shown in FIG. 1, valve cartridge 1 is inserted into an opening of a bearing block 3, which is configured in the form of a hydraulic block. The flange 2 is then placed over bearing block 3, so that both flange 2 and valve cartridge 1 are attached to bearing block 3 by the conical widening part 6. As such, a separate component, consisting of bearing block 3, valve cartridge 1, and flange 2, is pre-assembled, and is contained within the overall hydraulic system.

In the electrical portion of the known solenoid valve (FIG. 1), a separate coil 13 is installed in a frame yoke 14, together with the elastic blocks 33 and 34, and a plastic frame 24. A rubber part 32 is then inserted between frame yoke 14 and the upper wall 29 of the valve housing. Then, the completed assembly, consisting of frame yoke 14, coil 13, and elastic blocks 33 and 34, is installed so that the terminals of coil 13 extend through the contacting bores of the computer board 26.

The pre-assembled component, consisting of bearing block 3, valve cartridge 1 and flange 2, is now screwed on to the valve housing, such that elastic block 33 presses against flange plate 2. This screw connection causes the participating elements in the electrical portion to be placed under tension, which causes coil 13 to be placed in a longitudinal axial alignment relative to the rest of the structure. The terminals of coil 13 are rigidly connected in this longitudinal alignment; e.g., by soldering (27) to computer board 26. As a result, the longitudinal alignment is made permanent.

Permanent longitudinal fixing in conjunction with elastic elements can be problematic, however, since a change in the force relationships among the tolerance compensating elements (e.g., as a result of temperature influences) does not take into account the long-term behavior of elastic elements, or the influences caused by forces of inertia due to oscillations.

The assembly of valve cartridge 1 also requires several work phases. First, movable core 9 with ram 16 and the fixing spring (no reference number is provided), are introduced into a tube 11, which is used as an armature guide. Next, the inner part 7 is inserted and attached with the spacer 10 via its smaller diameter upper part 8. Then, a sealing seat element (no reference number is provided) is pressed into inner part 7 over the sealing ball 17, which includes a guide (no reference number is provided). Finally, it is necessary to assemble a pressure element (no reference number is provided) for ball 17 and spring 22, which pre-stresses this pressure element.

Typically, in the case of a braking pressure modulator application, additional valve variants, such as a normally open 2/2-way solenoid valve, or a 3/2-way solenoid valve, must be used in addition to a normally closed 2/2-way solenoid valve. However, no mention of these valve variants is made in the cited patent application.

It is therefore the object of the invention to provide a valve cartridge system suitable for a pre-engagement unit of a braking pressure modulator, in which the valve cartridge assembly is facilitated, while at the same time eliminating the need for elastic tolerance-compensating elements.

SUMMARY OF THE INVENTION

This object is achieved in a valve system for the pre-engagement unit of a braking pressure modulator. The inventive valve system comprises a one-piece housing, in which a square-shaped opening forms a first forked flange and a second forked flange. A first bore in the first forked flange is axially aligned with a second pocket bore in the second forked flange. A magnet coil, having an opening in the form of a straight circular cylinder, is positioned within the square-shaped opening of the housing. A valve cartridge, in the form of a cylinder with circular cross-section, is inserted into the housing from the first bore in the direction of the second pocket bore, so that the magnet coil can only be displaced in an axial direction. In addition, at least one pressure medium terminal is connected to at least one of the forked flanges.

One advantage of the present invention is that the valve cartridge can be assembled as a pre-testable component prior to installation in the housing, and that it can be replaced with another valve cartridge without adjustment.

In a further development of the invention, the valve cartridge is a solenoid valve cartridge actuated by a magnet coil, the solenoid valve cartridge comprising three individual cylindrical bodies connected end-to-end with no increase in cylinder diameter in an assembly direction so as to form an integral unit. The second cylinder body is hollow and contains an armature and an armature return device. The first and third cylinder bodies are optionally equipped with either sealing seats or armature stops. When there is no current flowing in the magnet coil, the armature of the second cylinder body presses against first cylinder body. Where there is current flowing in the magnet coil, the resultant magnetic field causes the armature to press against the third cylinder body.

A further advantage of the present invention is that components of the same type, e.g., armatures, valve bodies, and magnet coils, can be used interchangeably in different valve systems, thus reducing manufacturing costs.

BRIEF DESCRIPTION OF THE DRAWINGS

The invention is described in greater detail below through the example of embodiments shown in the drawings, wherein.

DETAILED DESCRIPTION OF PREFERRED EMBODIMENTS OF THE INVENTION

Figure 1:
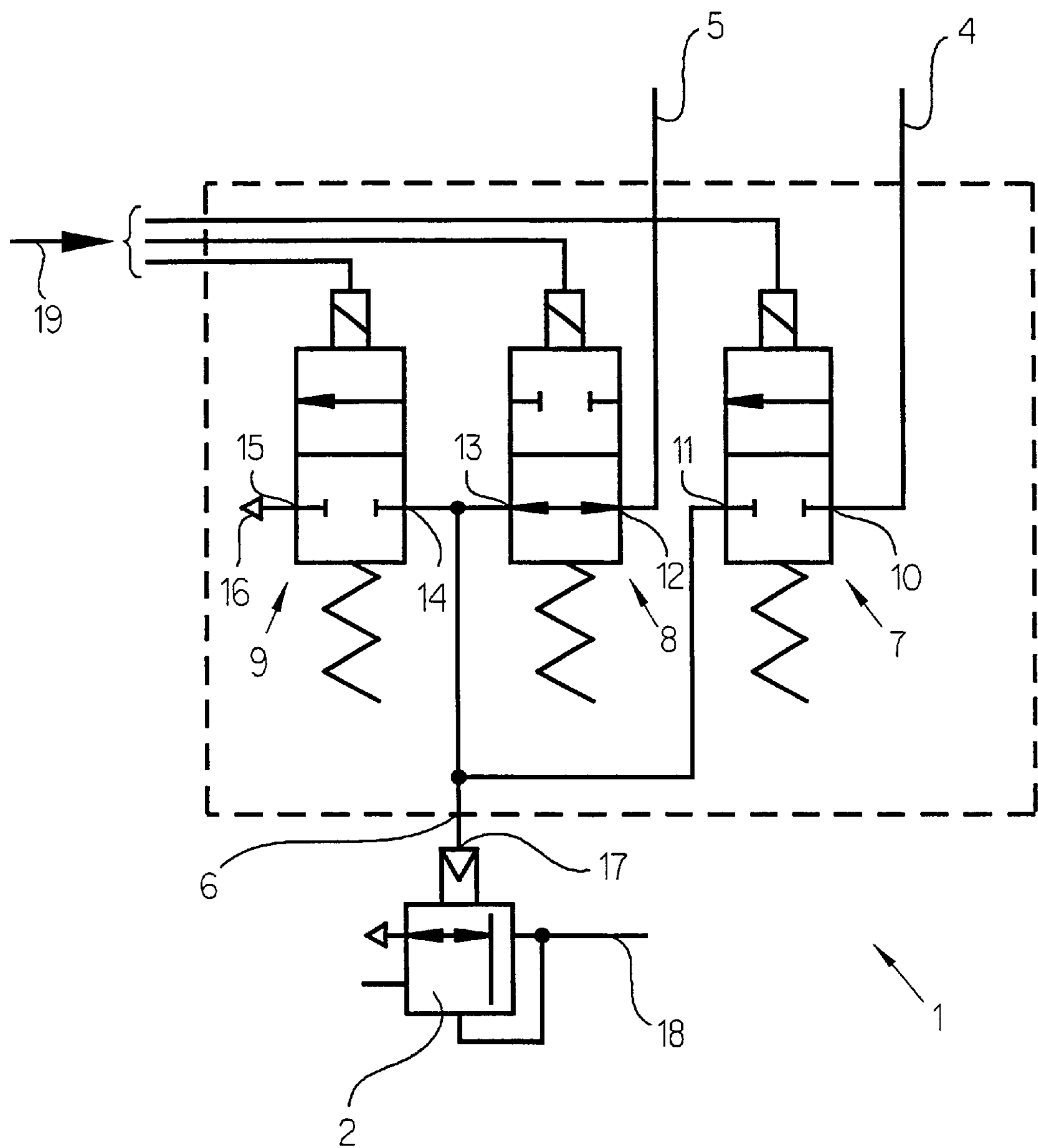
FIG. 1 is a schematic of the pre-engagement unit of a braking pressure modulator for a brake regulating circuit.

An electronically regulated braking system (EBS) for trailer vehicles has several brake regulating circuits working independently of each other for the wheel brakes of the vehicle (multi-channel system). A brake regulating circuit which represents a pressure regulating channel for a wheel brake consists of a pre-engagement unit made up of solenoid valves, an air-augmenting relay valve, at least one brake cylinder for the wheel brakes, a braking pressure sensor installed at a suitable location, and an electronic control system which carries out the braking pressure regulation.

The brake regulating circuit for the different channels of the multi-channel system are of identical construction, so that the description of one brake regulating circuit also describes the other brake regulating circuits. The embodiment described herein is based on the configuration of a basic variant for a trailer EBS system of a semi-trailer having two axles. The trailer EBS system is a 4S/2M system (four ABS sensors for four wheels and two modulator channels for the wheel brakes of the left or right side). The braking pressure regulation is therefore carried out per side.

The EBS trailer vehicle is connected to an EBS tractor vehicle via an electrical and via a pneumatic interface. The electrical interface consists of the digital data interface according to ISO 1199-2. The pneumatic interface consists first of the supply channel which supplies air to the trailer, and secondly of the braking line which is connected in the trailer to a trailer braking valve. The trailer braking valve puts out a braking pressure at its pneumatic output terminal which is derived from the braking pressure transmitted in the pneumatic braking channel and refers to it.

On the side of the EBS tractor vehicle, the supply and control lines are connected to a trailer control valve. The combination of the trailer control valve and the trailer braking valve provides security against a tear-off condition as is known from conventionally braked vehicle combination (tractor vehicle/trailer vehicle). (As used herein, the term "tear-off condition" refers to a condition wherein the two air tubes connecting the trailer to the tractor are "torn off." Due to a safety feature implemented in the trailer and tractor valves, automatic braking of the trailer takes place when this condition occurs.) In case of such a tear off condition, the trailer braking valve also transmits a braking pressure in the known manner.

Since the tear-off protection is made as stated in the same manner as for a conventionally braked vehicle, the EBS trailer vehicle can also be operated behind a tractor vehicle with a conventional braking system. Therefore, the trailer braking valve in the EBS trailer vehicle also contains the required functions of a conventional trailer braking valve in conventional braking systems, such as tear-off function and check valve.

In the trailer vehicle, the pressure transmitted by the trailer braking valve serves for pneumatic, redundant braking in case of an EBS failure. Furthermore, with the utilization of a pressure sensor located in the trailer braking valve, it serves to determine the electrical target value for the case that the EBS trailer is operated with a conventional tractor vehicle, i.e., with a non-EBS tractor vehicle. This transmitted pressure represents the redundancy pressure.

A pre-engagement unit 1 and an air-quantity amplifying relay valve 2 are shown in the pneumatic circuit of FIG. 1. The pre-engagement unit 1 is provided with a first pneumatic inlet 4, which is connected to a pressure supply (not shown), and with a second pneumatic inlet 5, which is connected to the pneumatic output terminal of a trailer brake valve (not shown) for the transmission of redundancy pressure. A pneumatic output terminal 6 of the pre-engagement unit 1 is connected to an inlet 17 of the relay valve 2. As described below, the solenoid valves of the pre-engagement unit 1 are actuated through electrical control cables from a control unit (not shown).

The pneumatic output terminal 18 of the relay valve 2 is connected to the brake cylinders (not shown) of this brake regulating circuit.

As shown in FIG. 1, three solenoid valves are provided in the pre-engagement unit 1. A first solenoid valve 7 has a first terminal 10 and a second terminal 11, a second solenoid valve 8 has a first terminal 12 and a second terminal 13, and a third solenoid valve 9 has a first terminal 14 and a second terminal 15.

The first terminal 10 of the first solenoid valve 7 is connected to the first pneumatic inlet 4 of the pre-engagement unit 1, the first terminal 12 of the second solenoid valve 8 is connected to the second pneumatic inlet of the pre-engagement unit 1, the second terminal 11 of the first solenoid valve 7 is connected to the pneumatic output terminal 6 of the pre-engagement unit 1, the second terminal 13 of the second solenoid valve 8 is connected to the first terminal 14 of the third solenoid valve 9 and to the pneumatic output terminal 6, and the second terminal 15 of the third solenoid valve 9 is connected to a pressure sink 16.

The first solenoid valve 7 and the third solenoid valve 9 are made in the form of normally closed 2/2-way solenoid valves, while the second solenoid valve 8 is made in the form of a normally open 2/2-way solenoid valve.

The solenoid valves 7, 8, and 9 of the pre-engagement unit 1 serve to determine the pressure in the control chamber of the relay valve 2. They are operated in a pulsating manner.

In its unactuated state, the second solenoid valve 8 is open and serves to transmit the redundancy pressure from the second pneumatic inlet 5 of the pre-engagement unit 1 into the control chamber of the relay valve 2, when the other solenoid valves 7 and 9 are not actuated. This redundancy pressure valve thus serves as an air admission valve as well as an exhaust valve for the control chamber pressure. In the actuated (closed) state, the second solenoid valve 8 cuts off the redundancy pressure from the control chamber of the relay valve 2.

The first solenoid valve 7 is designed as an air admission valve through its connection to the supply pressure at inlet 4, and the third solenoid valve 9 serves as an exhaust valve for the control chamber of the relay valve 2 through its connection to the pressure sink 16.

The solenoid valves 7, 8 and 9, contrary to the series connection of the valves according to the German patent document DE 42 27 084 A1, are connected in parallel to each other, so that they can be actuated simultaneously.

Thus, for example, in case of full braking when the air admission valve 7 is actuated to increase the pressure, the redundancy valve 8 can remain at the same time in its non-actuated (open) position. The redundancy pressure which increases during full braking assists the admission of air into the control chamber of the relay valve 2, so that the pressure build-up time is shortened. During exhaustion of a brake, the redundancy valve 8 can also remain in the nonactuated (open) state while the exhaust valve 9 is actuated, so that the time required for the pressure drop of the control-chamber pressure in the relay valve 2 is also shortened.

Due to the identical nature of the magnet coils and the armatures of the solenoid valves 7, 8 and 9, as mentioned below, these valves present an identical switching behavior so that a desired time response of pressure build-up and pressure drop in the control chamber of the relay valve 2 can be obtained in a very controlled manner by selecting suitable actuation times for the solenoid valves.

Figure 2:
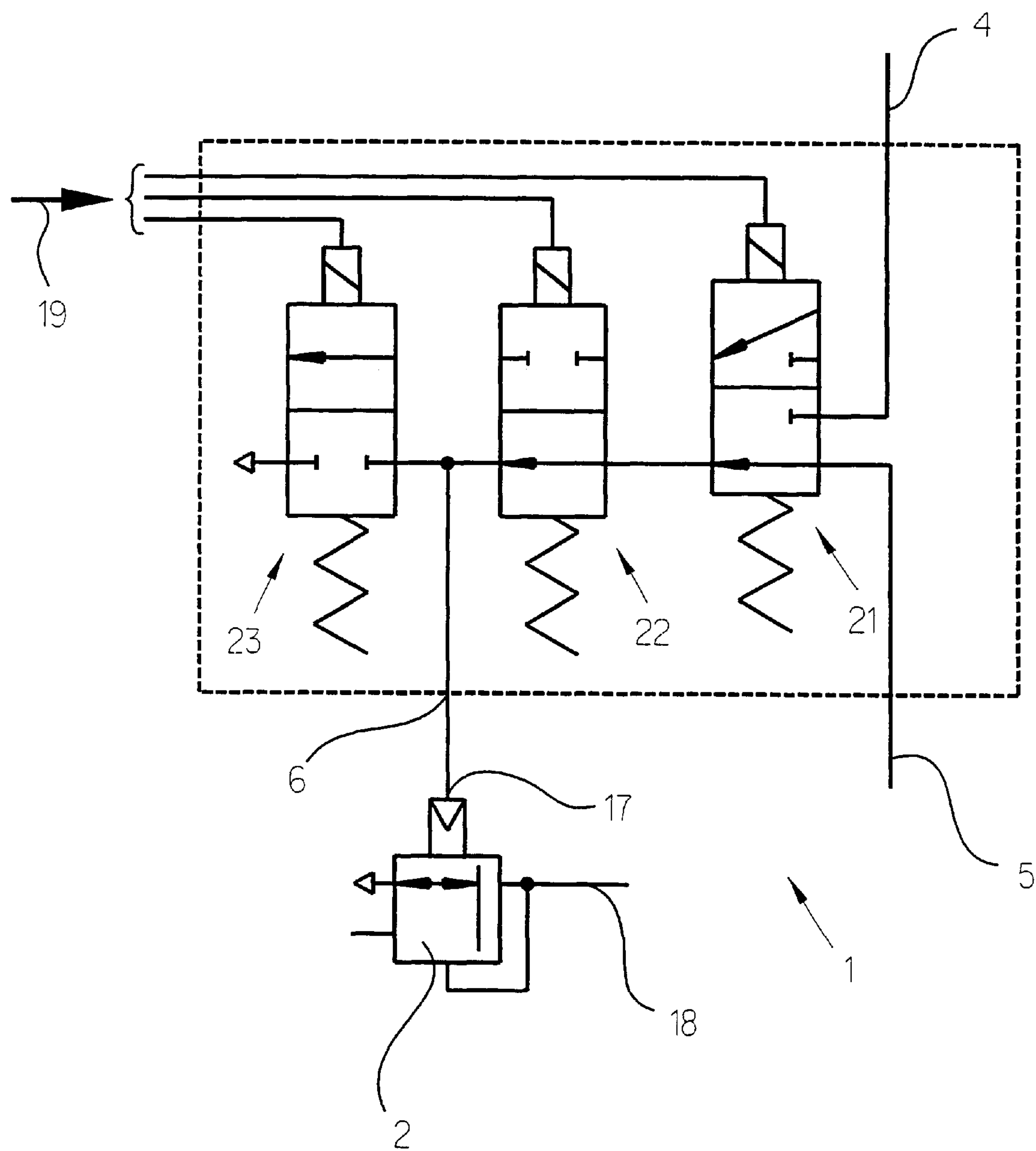
FIG. 2 shows a variant of a brake regulating circuit pre-engagement unit.

FIG. 2 shows a pneumatic circuit variant somewhat different from that of FIG. 1. The pre-engagement unit 1 of the brake regulating circuit of a braking pressure modulator is known from German patent 42 27 084 A1. A 3/2-way solenoid valve 21 acts as a reversing valve between a supply pressure connected to a first pneumatic inlet 4, and a redundancy pressure connected to the second pneumatic inlet 5. This redundancy pressure is switched on when the magnets are not actuated. The normally open 2/2-way solenoid valve 22 is connected in series with the reversing valve 21, and connects the pneumatic output terminal 6 to the pressure selected by the reversing valve 21. As such, valve 22 acts as an air admission valve. The normally open 2/2-way solenoid valve 23 vents the pneumatic output terminal 6 when actuated, thus functioning as an exhaust valve.

Figure 3:
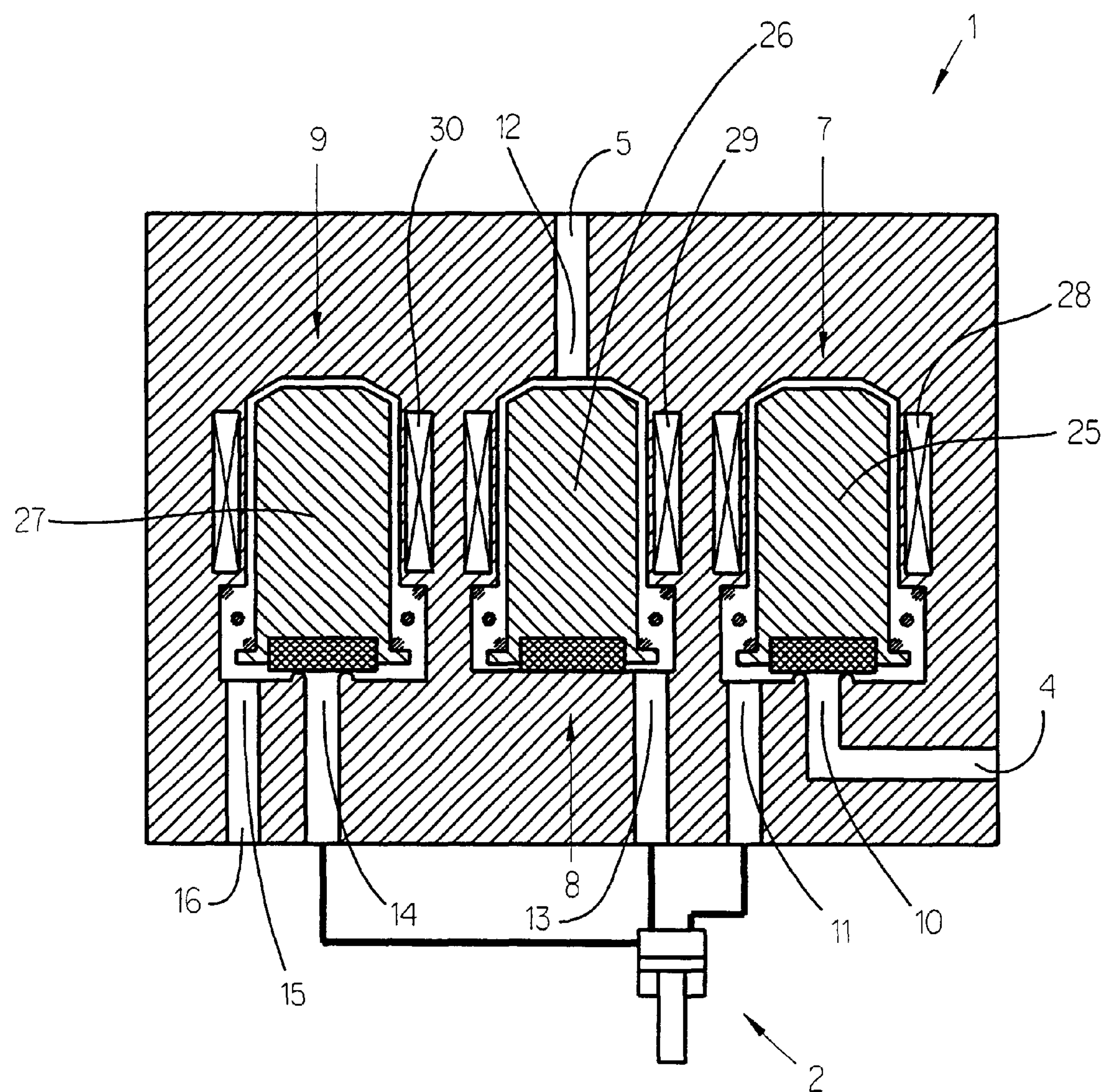
FIG. 3 shows a valve design for a pre-engagement unit in accordance with the circuit of FIG. 1.

FIG. 3 shows the detailed construction of the solenoid valves 7, 8, and 9 in a valve block having appropriate connecting conduits or channels. The armature 25 of the solenoid valve 7 is of the same construction as the armature 26 of the solenoid valve 8 and as that of the armature 27 of the solenoid valve 9. It should be noted that FIG. 3 shows the interconnection of the terminals 11, 13 and 14 of the pneumatic output terminal 6 of the pre-engagement unit 1 according to the preceding description.

FIGS. 4*a*–4*f* show how different functions can be realized by using armatures of the same type. The reference numbers are uniform for the different valve variants, so that they can be transferred directly from one valve design to another valve design. In FIGS. 4*a*–4*f*, a conventional valve design is assumed for simplicity, where the magnet coil is integrated with the armature. However, the following functional descriptions can also apply to the valve cartridge design disclosed below, in which the magnet coil is located in a component other than the armature unit.

Figure 4A:
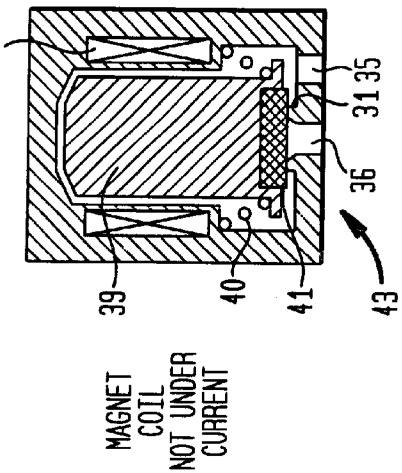
FIGS. 4*a*–4*f* show several designs of an armature and its integration in a magnet coil, in order to constitute a hermetically sealing valve seat for the magnet when not under current, and a non-hermetically sealing metal-to-metal valve seat for the magnet when under current.

A normally closed 2/2-way solenoid valve 43 is shown in FIG. 4*a* in the currentless position of the magnet coil 38. Since no magnetic force acts in this position, the armature 39 is displaced by the force of the armature return spring 40 against a valve lift stop where a sealing seat 31 is provided at this location. An elastomer insert 41 is pressed against the sealing seat 31 and the first terminal 35 is hermetically sealed off from the second terminal 36.

Figure 4B:
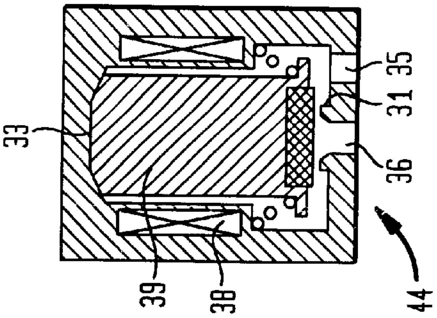

A normally closed 2/2-way solenoid valve 44 is shown in FIG. 4*b* in the current flowing state of the magnet coil 38. The armature 39 is pressed by the magnetic force against a valve lift stop 33, the valve seat 31 opens, and the first terminal 35 is connected to the second terminal 36.

Figure 4C:
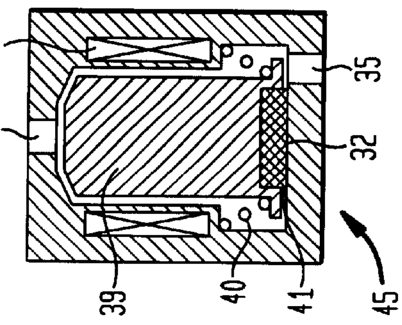

The next valve variant shows in FIG. 4*c* a normally open 2/2-way solenoid valve 45 in the currentless switching state. Under the action of the armature return spring 40, the armature 39 is pressed against a valve lift stop 32 which, however, is not equipped with a sealing seat in this case. In this switching position, the first terminal 35 is connected to the second terminal 36.

Figure 4D:
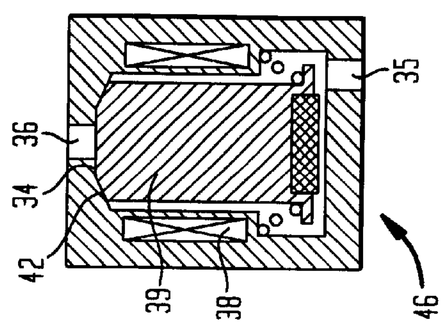

The normally open 2/2-way solenoid valve 46 is shown in FIG. 4*d* in the switching state under current. The armature 39 is pressed against a valve lift stop 34 and due to the shaped surface 42 on the armature 39 constitutes at this point a metal-to-metal valve seat together with the second terminal 36. The first terminal 35 is separated from the second terminal 36. The metal-to-metal valve seat, contrary to the valve seat described earlier using the elastomer insert 41, is not hermetically sealing, i.e., leakage occurs. As explained below, the pneumatic circuit technology used for the utilization of these valves is selected so that these leakages are of no importance.

Figure 4E:
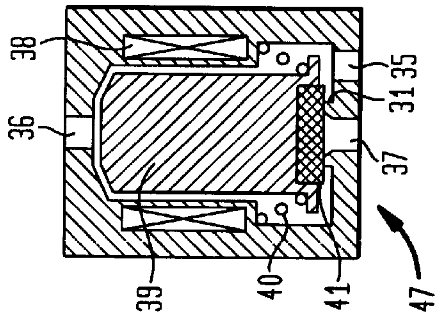
Figure 4F:
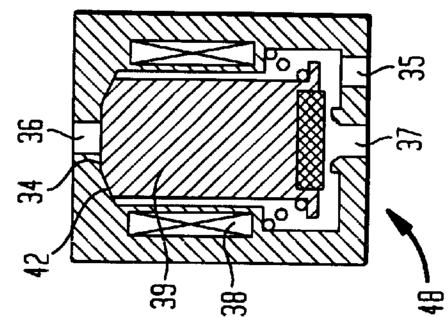

Although such a valve is not needed with the pre-engagement unit of the present invention, FIGS. 4*e* and 4*f* show for the sake of completeness that by using the same armature 39, it is also possible to constitute the 3/2-way solenoid valves 47 and 48.

In FIG. 4*e*, the 3/2-way solenoid valve 47 is shown in the currentless switching state of the magnet coil 38. Under the action of the armature return spring 40, the armature 39 is pressed against the valve lift stop 31 with the sealing seat. The first terminal 35 is separated from the third terminal 37 via this valve seat, but a connection exists between the first terminal 35 and the second terminal 36.

In FIG. 4*f*, the 3/2-way solenoid valve 48 is shown in its state under current. The magnetic force causes the armature 39 to be pressed against the valve lift stop 34 with its shaped surface 42 constituting a metal-to-metal sealing seat. As a result, the first terminal 35 is separated from the second terminal 36, but the first terminal 35 is connected to the third terminal 37.

By comparison with the pneumatic circuit of FIG. 1 which utilizes the valve design according to FIG. 3, it is shown that in the rest position of the pre-engagement unit which is given by the currentless switching state of all three solenoid valves 7, 8 and 9, only hermetically sealing valve seats are being used under the effect of the armature return spring. Thus, the solenoid valves 7 and 9 are closed and the solenoid valve 8 is open in the currentless switching state.

Only when a desired change takes place in the control chamber pressure in the relay valve 2 is the air admission valve 7 actuated to increase the pressure, or the exhaust valve 9 is actuated to decrease the pressure, each in pulsating fashion.

If the influence of the redundancy pressure is to be eliminated with this pressure increase or pressure reduction, the redundancy pressure valve 8 is actuated and the redundancy pressure appearing at the second pneumatic inlet 5 is separated from the relay valve control chamber (pneumatic output terminal 6) by the metal-to-metal valve seat which takes effect in this switching state.

Since leakage may occur at this valve seat as mentioned earlier, the separation is not hermetical, i.e., the existing redundancy pressure will influence the control chamber pressure in the relay valve 2 to a small extent by the valve seat leakage. This influence is unimportant, however, since, as explained before, a pulsating air admission takes place at the same time through the air admission valve 7, or a pulsating exhaust takes place through the exhaust valve 9, with the full cross-sections of these valves taking effect in either case. The leakage cross-section is on the one hand extraordinarily small as compared to the valve cross-sections, and on the other hand pulsation is carried out in a closed regulation loop, i.e., air admission or exhaust pulsation takes place, until the braking pressure delivered at the pneumatic output terminal 18 of the relay valve 2 is equal to a target braking pressure calculated by the electronic control unit. (The calculation of the target braking pressure value in the electronic control unit is based, in addition to the, electrical braking set value, on additional influence factors caused by load or ABS brake regulation.) When the target braking pressure value is reached, pulsation is terminated and the solenoid valves 7 and 9 are placed again in the currentless switching state; the redundancy valve 8 continues to remain actuated. If a minute exhaust of the control chamber of the 2 should now occur due to the metal-to-metal valve seat, recognized by a lowering of pressure at the pneumatic output terminal 18, this lowering of pressure is compensated for within the framework of pressure regulation by means of a single pulsation of the air admission valve 7.

When a valve seat is closed by the magnetic force and after the magnet coil is first subjected to current, only a low magnetic force flow is built up due to the distance in space between the armature and the valve seat (the ferromagnetic circuit is not closed). In order to move the armature at all, a strong current must produce a strong actuating force which is only a fraction of the subsequent holding force for the armature. Due to the constant feeding of a very strong current, the armature of a solenoid valve is accelerated and thereby kinetic energy is built up which is dissipated again when the armature touches the valve seat.

In conventional valves according to the state of the art, an elastomer insert produces the seal at the valve seat.

In order to avoid the destruction of the elastomer during a lasting load by the dissipation of the kinetic accelerating energy of the armature when it meets the valve seat, such an elastomer insert is not connected rigidly but elastically to the body of the armature. In the German patent document DE 27 57 803 A1, FIG. 4 shows an armature with two elastomer sealing inserts (therein 50' and 52') for two valve seats that are supported elastically (therein by springs 51 and 53). An elastic sealing seat of this type of construction requires a relatively long valve stroke that may be, e.g., 1.2 mm long so that the spring action may be at all effective. Such a construction also requires a certain minimum structural size so that an elastic construction may fit in, and this leads to a relatively large armature mass that in turn requires a corresponding reinforcement of the armature return spring. The stronger return spring then leads to an increase of the required magnetic force to about 30 N with such a valve seat construction. The switching time (current supplied to the magnet coil until the valve seat closes) is essentially the time required to build up the current in the magnet coil and is typically on the order of 25 ms.

In applications for pre-engagement, these valves must normally have a nominal width of approximately 2.2 mm in order to avoid a sharp pressure drop that may occur through the compressed air pilot lines which bridge the distance between a valve and the air accumulating relay valve control chamber.

When these type of pre-engagement valves are operated in a closed pressure regulation mode, the nominal value of approximately 2.2 mm causes the emitted pressure not to be very fine-tuned by steps and the switching time of approximately 25 ms leads with a conventional scanning regulator to a limitation of the obtainable pressure gradient of the emitted pressure used.

With a valve design according to the present invention, however, and due to the fact that the armature has an elastomer insert at only one end and not at both ends, and due also to the fact that on the opposite end of same there is only a shaped surface to constitute a metal-to-metal sealing seat, it is possible to employ a small structural form for the armature. As a result, the mass of the armature is reduced to approximately 6 g and due to the weak armature return spring, a magnetic force of only approximately 6 N is required.

Providing the armature with a shock absorbing coating as suggested in the German patent document DE 197 30 276 A1 ensures suitable resistance to acceleration of the shaped surface at the metal-to-metal sealing seat.

Due to the fact that the sealing in a metal-to-metal sealing coat is not achieved by compressing the elastomer and that no range of spring is necessary, a very short valve stroke of approximately 0.5 mm can be employed. With this short valve stroke and the already weak armature return spring, an elastic support of the elastomer insert as in the above-mentioned state of the art is no longer necessary.

Thanks to these optimized compressed air connections, the nominal width of a solenoid valve can be reduced to a value around 1.7 mm, representing an optimal value for a pilot valve in vehicle applications. It ensures on the one hand that the braking pressure can be well transmitted in steps, and on the other hand it is not so small that the usual pollution of the compressed air in vehicles would play a role.

By means of the measures described here, the switching times of the solenoid valves can be reduced to approximately 6 ms instead of the 25 ms typical of the state of the art. With the reduced switching times, rapidly changing set target values for the braking pressure regulator can be realized, and high gradients for the generated braking pressure can be realized at the output terminal 18 of the relay valve 2.

Figure 5A:
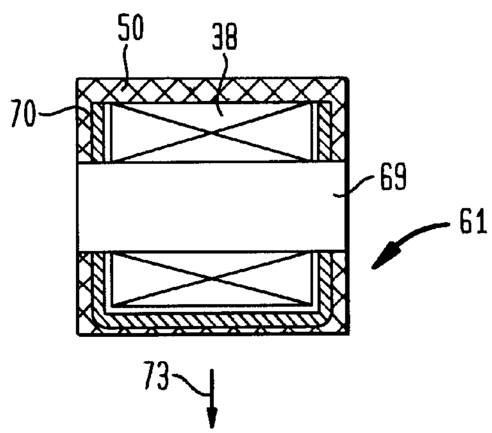
FIGS. 5*a*–5*c* show a valve cartridge, a housing, and a magnet coil as separate components, and also shows the assembly of these components in accordance with the invention.
Figure 5B:
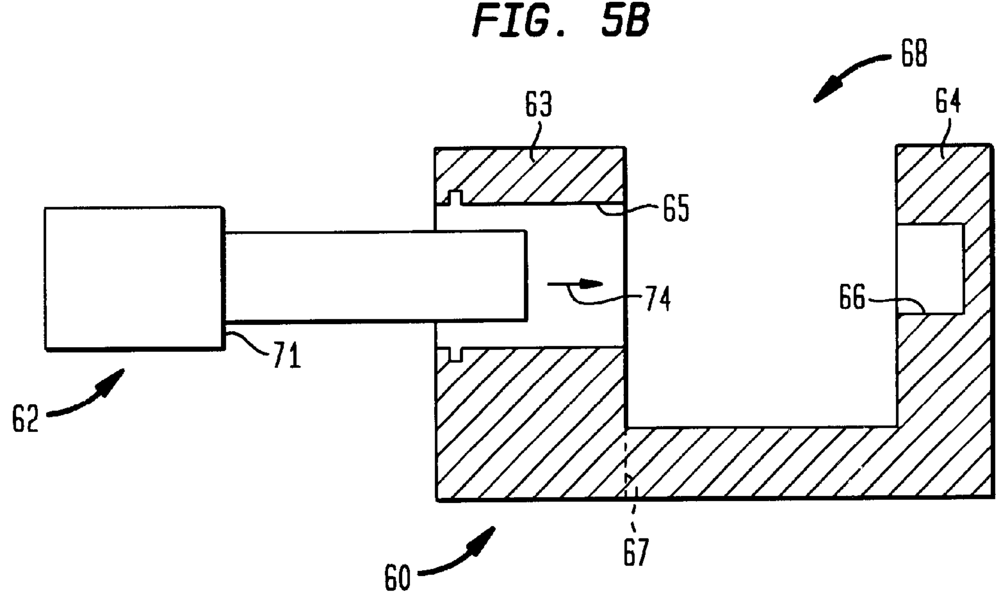
Figure 5C:
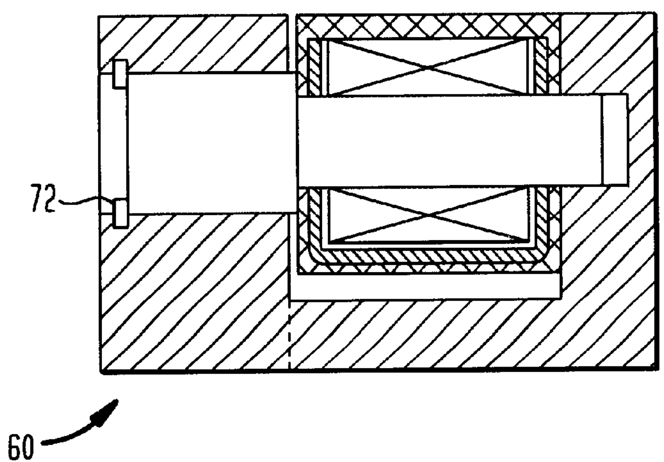

FIGS. 5*a*–5*c* show the different components associated with a valve cartridge, in accordance with the invention. In FIGS. 5*a* and 5*b*, these components are represented as individual parts before being assembled. In FIG. 5*c*, the components are shown in their assembled state.

A magnet coil unit 61 (FIG. 5*a*), a housing 60 (FIG. 5*b*), and a valve cartridge 62 (FIG. 5*b*) are shown as three separate components. The housing 60 (FIG. 5*b*), configured with a square-shaped opening 68, forms a first forked flange 63 and a second forked flange 64. For manufacturing reasons, the housing 60 can be made up of several parts, as indicated illustratively by the parting line 67 on the first forked flange 63. In any event, after assembly of these parts, the housing 60 is considered herein to be a single component. A first bore 65 is provided in the first forked flange 63 and, coaxially to the first bore 65, a second pocket bore 66 is provided in the second forked flange 64.

As shown in FIGS. 5*a* and 5*b*, the magnet coil unit 61 and the square-shaped opening 68 are designed so that the magnet coil unit 61 can be positioned into the square-shaped opening 68 in a first assembly direction 73. The magnet coil unit 61 has an opening 69 in the form of a straight circular cylinder. Inside the magnet coil unit 61 are the actual magnet coil 38 and the sheet metal yoke 70, which is made of a ferromagnetic material. In order to assemble the magnet coil unit 61, the magnet coil 38 is inserted into the sheet metal yoke 70. Then, by using a suitable assembly core to maintain the 69 opening, these parts are extrusion-coated with a plastic 50.

The valve cartridge 62 is constructed either in the form of a straight cylinder with a circular cross-section, or in the form of a straight stepped cylinder with a circular cross-section. In the embodiment of FIG. 5*b*, the valve cartridge 62 is shown in the form of a stepped cylinder with one cylinder step 71.

Referring again to FIG. 5*b*, the larger diameter of the stepped cylinder valve cartridge 62 (except for the necessary tolerances) is sized so that it is equal to the diameter of the first bore 65, and, similarly, the smaller diameter of the stepped cylinder valve cartridge 62 is sized to be equal to the diameter of the second pocket bore 66. As such, the valve cartridge 62 can be inserted into the housing 60 with the magnet coil unit 61 already in place, in a second assembly direction 74, as indicated in FIG. 5*b*. Valve cartridge 62 is positioned in the housing 60 so that it is properly aligned within the magnet coil 61, as will be described in greater detail below, with respect to FIG. 7.

Referring now to FIGS. 5*b* and 5*c*, the valve cartridge 62 is then attached to the first forked flange 63 by fastening means 72, which exerts a force in the assembly direction, i.e., 74. This force acts via the face of the cylinder step 71 upon the magnet coil unit 61, and is finally absorbed by the second forked flange 64. The magnet coil unit 61 is thus fixed in place by the effect of this force. Moreover, this "fixing force" causes the second forked flange 64 to be elastically spread open relative to the first forked flange 63.

Fastening means 72 can be implemented in a variety of ways, such as caulking, snap ring, threads (positive fit means), or even such non-positive means as adhesive, or press-connections.

Figure 6:
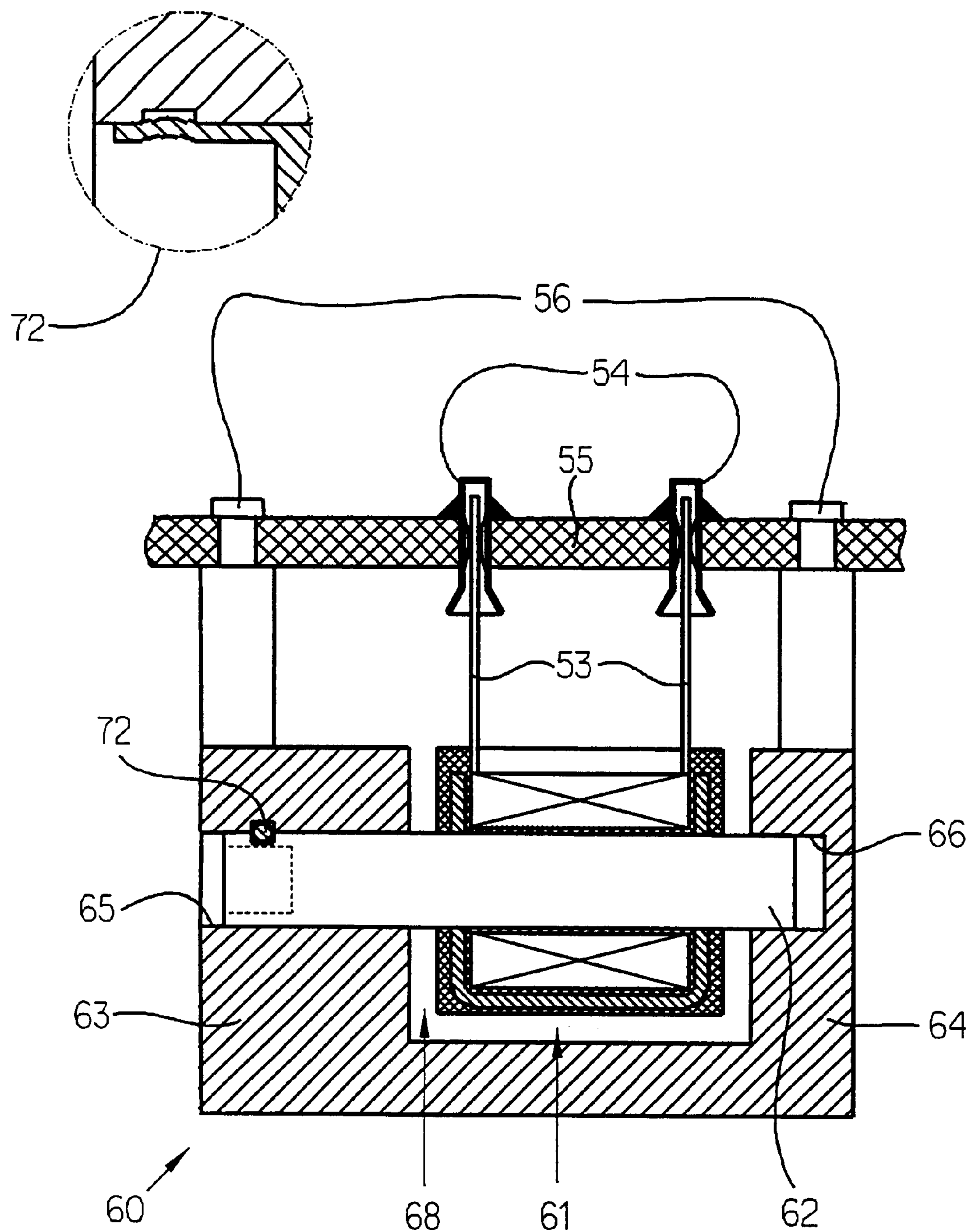
FIG. 6 shows a variant of the valve cartridge assembly of FIG. 5.

An alternative method of fixing the axial position of the magnet coil unit 61 is shown in the embodiment of FIG. 6. In this embodiment, the valve cartridge 62 has the form of a straight cylinder with circular cross-section. As such, the diameters of the first bore 65 and of the second pocket bore 66 are both equal to the diameter of the straight cylinder valve cartridge 62.

In similar fashion to the assembly process described above, the magnet coil unit 61 is positioned in the housing opening 68 of the housing 60, and the valve cartridge 62 is then inserted in the assembly direction from forked flange 63 to forked flange 64. Valve cartridge 62 is then attached by fastening means 72 to the first forked flange 63, effective on both sides, so that the axial position of the valve cartridge 62 is fixed within the bores 65 and 66. Illustratively, the enlarged detail of the fastening means 72 shows it in the form of beading.

The attachment of the valve cartridge 62, however, does not fix the position of the magnet coil unit 61, which could still be capable of displacement along the valve cartridge 62 axis.

As further shown in FIG. 6, the position of the magnet coil unit 61 is fixed relative to the valve cartridge 62 axis by an additional component; namely, an electronic board 55. This board 55 is attached by fastening means 56 to the housing 60, so that the position of the board 55 is fixed relative to the housing 60.

The magnet coil unit 61 is fixed relative to the electronic board 55 by contact pins 53, which are inserted into corresponding receiving sockets 54. These sockets 54 are securely affixed to the board 55 by means of soldered connections.

The above described assembly sequence of the FIG. 6 embodiment can also be modified, such that the magnet coil unit 61 is first positioned by introducing its contact pins 53 into the contacting bores of the board 55, and by soldering to same in a first phase. Then, the board 55 is connected to the housing 60 by the fastening means 56, and finally, the valve cartridge 62 is inserted into the forked flanges 63 and 64, and attached by fastening means 72 to the first forked flange 63.

Figure 7:
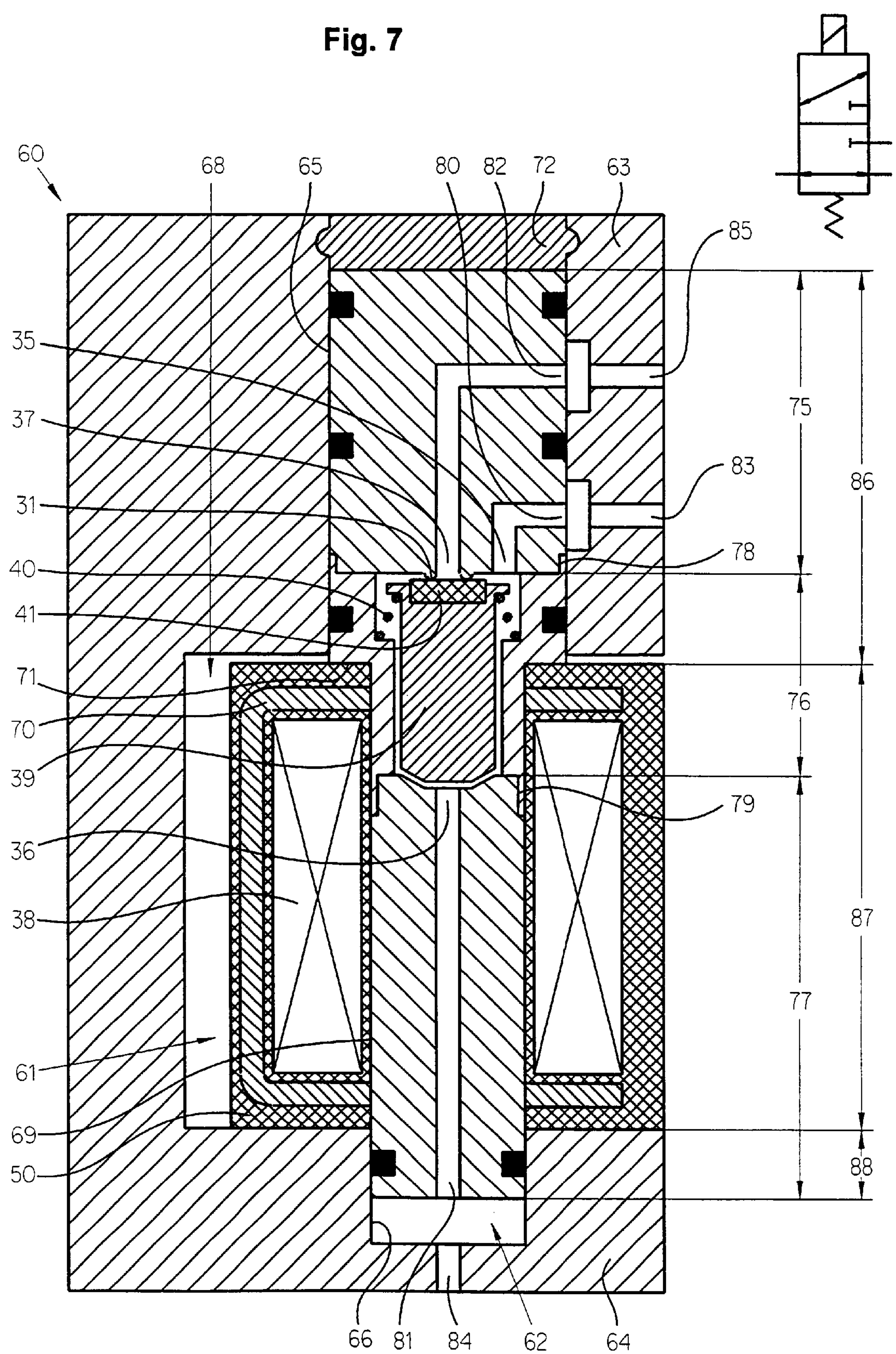
FIG. 7 shows the design and structure of a 3/2-way cartridge solenoid valve in accordance with the invention.

FIG. 7 shows a detailed cross-section view of a valve cartridge of the type depicted in FIG. 5*b*, in the form of a 3/2-way cartridge solenoid valve.

The valve cartridge in FIG. 7 is configured of three individual cylindrical bodies, designated as first cylinder body 75, second cylinder body 76, and third cylinder body 77, in the order of assembly direction. Cylinder bodies 75 and 77 have circular cross-sections, while cylinder body 76 has a stepped configuration. Illustratively, cylinder body 76 could have more than one step, in accordance with design preferences.

The cylinder bodies 75, 76, and 77 are aligned so that the cylinder diameter either decreases in the assembly direction (as shown in FIG. 7), or remains the same. The first cylinder body 75 and the second cylinder body 76 are joined by a connector 78, which cannot be disconnected by itself. Similarly, the second cylinder body 76 is joined to the third cylinder body 77 by a connector 79. In this case, connector 79 could be in the form of a non-separable connection, such as crimping, pressing, soldering or gluing. Alternatively, the connector 79 could be in the form of a separable connection, such as threads.

The first cylinder body 75 and the second cylinder body 76 are constructed of non-magnetic material, while the third cylinder body 77 is made of a ferromagnetic material.

The second cylinder body 76 is made in the form of a hollow body, and contains the armature 39 and the armature return spring 40. This configuration is similar to that of references 47 and 48 in FIGS. 4*e* and 4*f*.

At the delimitation of the second cylinder body 76, the sealing seat 31 (also described above with reference to FIGS. 4*a* and 4*b*) is formed on the first cylinder body 75. Sealing seat 31 also serves as the valve lift stop for the armature 39 when there is no current flowing in the magnet coil 38.

A terminal 36 is provided on the third valve body 77, at its delimitation point with the second valve body 76. Terminal 36 serves as a valve lift stop for the armature 39, when under the influence of the magnetic force. This constitutes the previously described metal-to-metal valve seat at the corresponding location to the interaction with the shaped surface 42 of the armature 39 in FIGS. 4*d* and 4*f*.

The solenoid valve arrangement in the second cylinder body 76 has the above-mentioned (FIGS. 4*e* and 4*f*) first, second and third terminals 35, 36, and 37, respectively. These terminals are connected in the indicated sequence by channels in the first (75) and third (77) cylinder bodies to a first cartridge-pressure medium terminal 80, a second cartridge-pressure medium terminal 81, and a third cartridge-pressure medium terminal 82. The type and number of the cartridge-pressure medium connections are thus determined by the desired type of solenoid valve. In the illustrative case of FIG. 7, a 3/2-way solenoid valve is shown, as previously described.

The first and third cartridge-pressure medium terminals 80 and 82 provided in the first cylinder body 75 are made in the form of radial pressure medium terminals. The second cartridge-pressure medium terminal 81 provided in the third cylinder body 77 is made in the form of an axial cartridge-pressure medium terminal. The design of the cartridge-pressure medium terminals 80 and 82 results from the type of fastening means 72, which covers the front of the first cylinder body 75. The axial second cartridge-pressure medium terminal 81 can also be designed as a radial pressure medium terminal, but can be implemented very simply as an axial pressure-medium terminal in the form of a simple bore within the ferromagnetic material.

Corresponding to the cartridge-pressure medium terminals, housing-pressure medium terminals for pneumatic interlinking of the cartridge valves are provided in the housing 60, within the first and second forked flanges 63 and 64, respectively. In the first forked flange 63, a first housing-pressure medium terminal 83 connects to the first cartridge-pressure medium terminal 80, while a third housing-pressure terminal 85 connects to the third cartridge-pressure medium terminal 82. A second housing-pressure medium terminal 84 is provided on the second forked flange 64, and connects to the second cartridge-pressure medium terminal 81.

Since the first and second cylinder bodies 75 and 76 are made of a non-ferromagnetic material, they can both be made of a material such as brass. Furthermore, since they are connected to each other, the two cylinder bodies can also be made in a single piece, e.g., as a lathed part. Thus, the inventive objective of simplifying the manufacturing process leads to the manufacturing of the two cylinder bodies 75 and 76 as a single part in a single step.

When current flows through the magnet coil 38, a strong magnetic field builds up on the magnetic circuit components of the valve cartridge 62 and the magnet coil unit 61. The force of this magnetic field causes the armature 39 to move, since it is part of the ferromagnetic circuit constituted by the sheet metal yoke 70, the armature 39, and the third cylinder body 77.

The sphere of influence of this ferromagnetic circuit consists of the area designated by reference number 87. Illustratively, the valve cartridge 62 can be divided into three functional zones, a first cartridge functional zone 86, a second cartridge functional zone 87, and a third cartridge functional zone 88.

The first cartridge functional zone 86 extends from the beginning of the first cylinder body 75 into the area of the second cylinder body 76 that is outside the ferromagnetic circuit described above. The second cartridge functional zone 87 represents the sphere of influence of the ferromagnetic circuit, and extends from the beginning of the second cylinder body 76 into the portion of the third cylinder body 77 where the ferromagnetic circuit ends. The third cartridge functional zone 88 extends into the third cylinder body 77 from the end of the ferromagnetic circuit to the end of the cylinder body.

The first and third cartridge-pressure medium terminals 80 and 82 are located in the first cartridge functional zone 86, and the second cartridge-pressure medium terminal 81 is located in the third cartridge functional zone 88. In addition to defining the location areas of the pressure medium terminals, the first and the third cartridge functional zones 86 and 88 also serve for the axial guidance of the valve cartridge 62.

Figure 8:
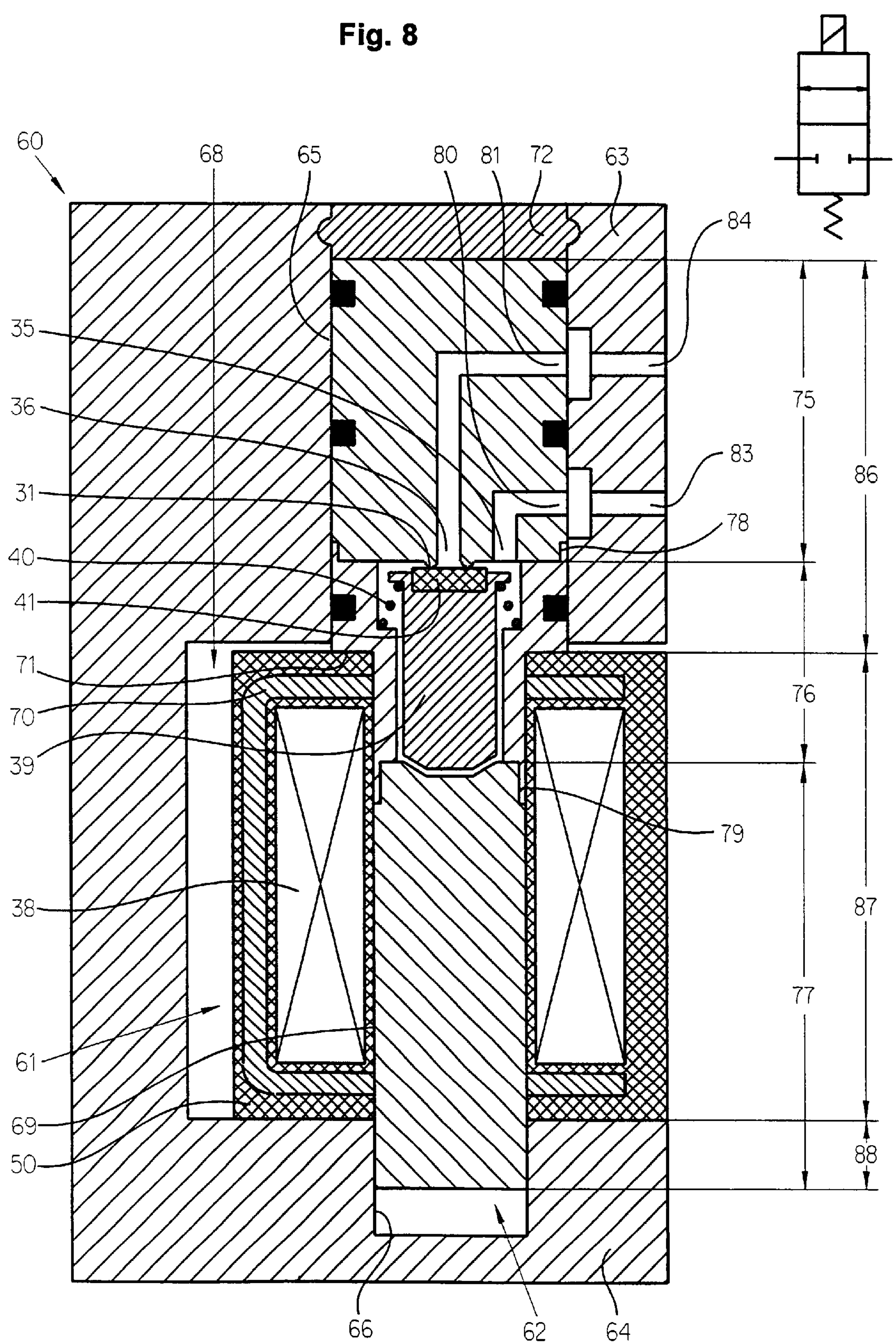
FIG. 8 shows the design and structure of a normally closed 2/2-way cartridge solenoid valve in accordance with the invention.
Figure 9:
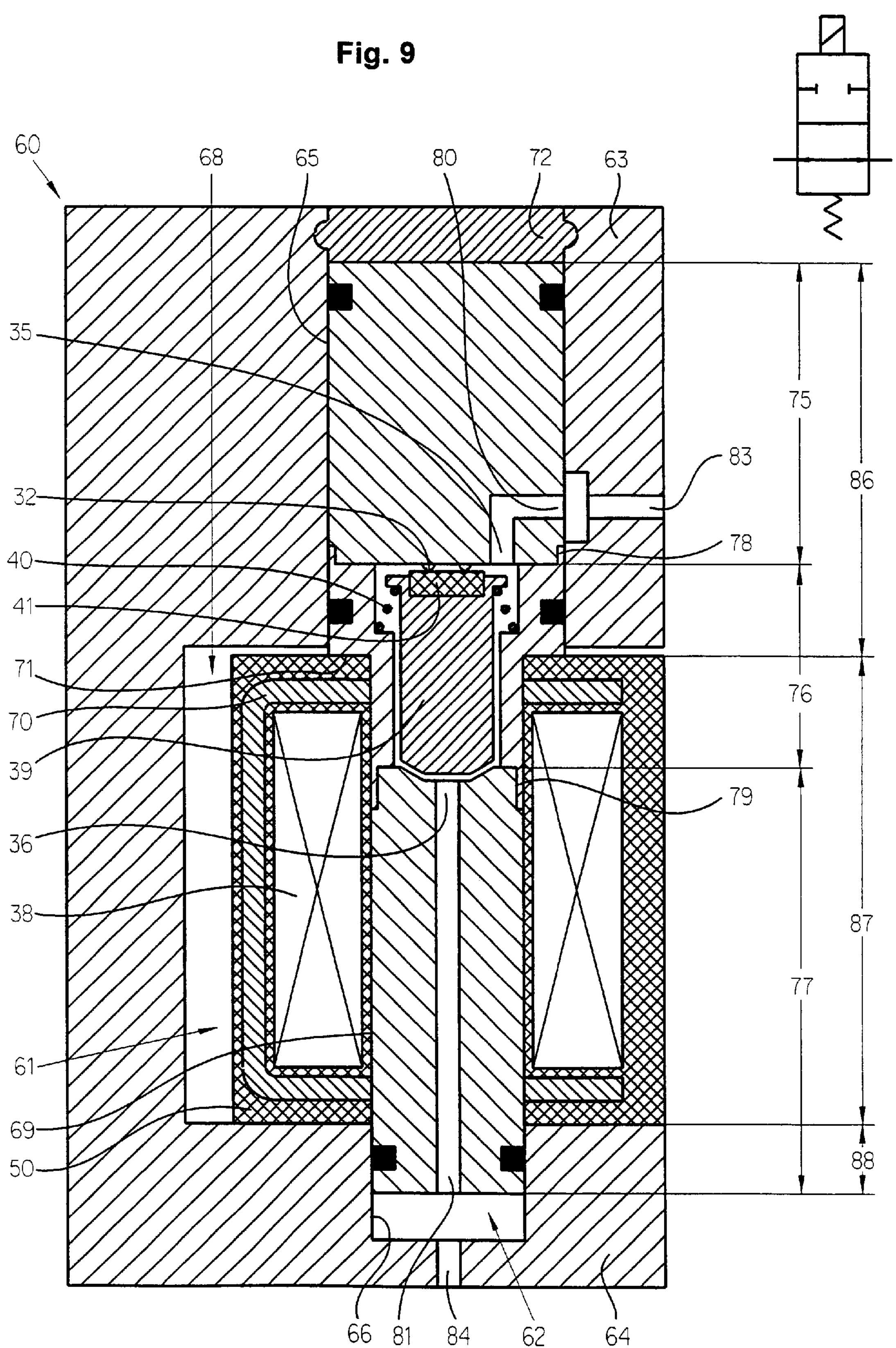
FIG. 9 shows the design and structure of a normally open 2/2-way cartridge solenoid valve in accordance with the invention.

The valve cartridges shown in FIGS. 8 and 9 are basically constructed in the same manner as the valve cartridge of FIG. 7. Therefore, the descriptions given above for FIG. 7 apply as well to FIGS. 8 and 9, including the corresponding reference numbers. Since the valve cartridges of FIGS. 8 and 9 are somewhat simpler in design than the valve cartridge of FIG. 7, the following descriptions for FIGS. 8 and 9 are limited to these simplified differences.

FIG. 8 shows a valve cartridge 62 with its appertaining components in the embodiment of a normally closed 2/2-way cartridge solenoid valve.

The second cylinder body 76, made in the form of a hollow body, contains the armature 39 and the armature return spring 40, similarly to the configurations of reference numbers 43 and 44 in FIGS. 4*a* and 4*b*. As previously described in reference to FIG. 7, the sealing seat 31 is formed at the delimitation of the second cylinder body 76, and also serves as a valve lift stop for the armature 39 when there is no current flowing in magnet coil 38.

In similar fashion to the valve design described above (FIGS. 4*a* and 4*b*), a first cartridge-pressure medium terminal 80 (FIG. 8) and a housing-pressure medium terminal 83, corresponding to the first terminal 35 (FIGS. 4*a* and 4*b*) are provided. Also, corresponding to the second terminal 36 (FIGS. 4*a* and 4*b*), a second cartridge-pressure medium terminal 81 and a second housing-pressure medium terminal 84 are provided. Both cartridge-pressure medium terminals 80 and 81 are located in the first cartridge functional zone 86.

FIG. 9 shows the valve cartridge 62 with its appertaining components in the embodiment of a normally open 2/2-way cartridge solenoid valve. The armature 39 and the armature return spring 40 are located in the hollow body of the second cylinder body 76, as in the description regarding reference numbers 45 and 46 in FIGS. 4*c* and 4*d*. The second terminal 36 (FIG. 9), which serves as a valve lift stop for the armature 39 when subjected to magnetic force, is located in the third cylinder body 77, at the delimitation to the second cylinder body 76. Together with the surface 42, as shown in FIG. 4*d*, second terminal 36 constitutes a metal-to-metal valve seat at this location.

Referring again to FIG. 9, the first cartridge-pressure medium terminal 80, located in the first cartridge functional zone 86, and the first housing-pressure medium terminal 83 correspond to the first terminal 35 of FIGS. 4*c* and 4*d* Corresponding to the second terminal 36 of FIGS. 4*c* and 4*d*, the second cartridge-pressure medium terminal 81 (FIG. 9), is located in the third cartridge functional zone 88, and is connected to the second housing-pressure medium terminal 84.

A comparison of FIG. 7 with FIGS. 8 and 9 shows that at least one cartridge-pressure medium terminal is provided in the first cartridge functional zone 86, while a pressure medium terminal may or may not be provided in the third cartridge functional zone, depending on the type of solenoid valve used.

Regarding the alternative fixing of the magnet coil unit 61 in FIG. 6, it should be noted that a valve cartridge suitable for this type of fixing, with three interconnected cylinder bodies, is basically of identical construction as the valve cartridges shown in FIGS. 7 to 9. In an embodiment of this type, all the cylinder bodies are made with a circular cross-section; i.e., there are no cylinder steps in such valve cartridges.

Figure 10:
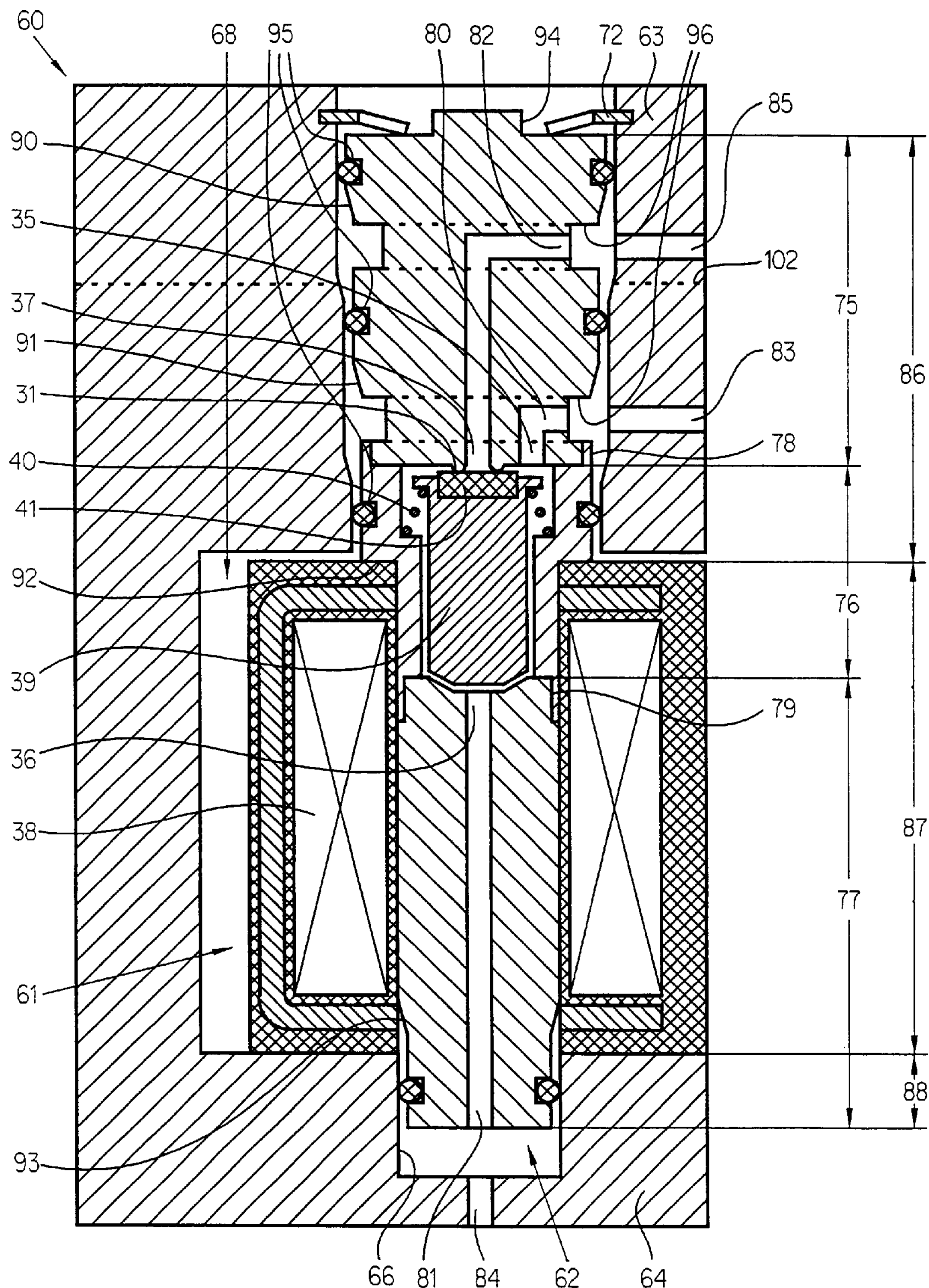
FIG. 10 shows a valve cartridge as in FIG. 7, with seals and pressure medium terminals in accordance with the invention.

As described above, the cylinder steps in a valve cartridge serve to reduce the diameter in the assembly direction, and can be in the form of a perpendicular step. However, valve cartridge cylinder steps may also take a different form, as illustrated in FIG. 10. In this example, O-rings are used as the sealing means, capable of being inserted into grooved depressions 95 in the valve cartridge 62. It may then be advantageous to provide several valve steps to carry out the diameter reduction, where the valve steps are either slanted or perpendicular.

FIG. 10 shows a slanted first valve step 90, a slanted second valve step 91, a right-angle third valve step 92, and a slanted fourth valve step 93. This type of design is advantageous, because the valve cartridge 62 can be inserted with the O-rings pre-assembled in the grooved depressions 95, without damaging the O-rings by sliding them over the housing-pressure connections 85 and 83.

FIG. 10 also shows the fastening means 72 in the form of a lock ring, so that the valve cartridge 62 has a turned step 94 at this location. In addition, turned groove connections 96 are made on the cartridge-pressure medium terminals 80 and 82, which serve to optimize the flow of air, in the sense that throttled cross-sections are avoided.

It should be noted that the turned step 94, the turned groove connections 96, and the grooved depressions 95 do not represent cylinder steps as defined in this invention, since the reductions of diameter which are associated with the turned step 94, the grooved depressions 95 and the turned grooves 96 only reduce the cylinder diameter temporarily in the assembly direction.

Figure 11:
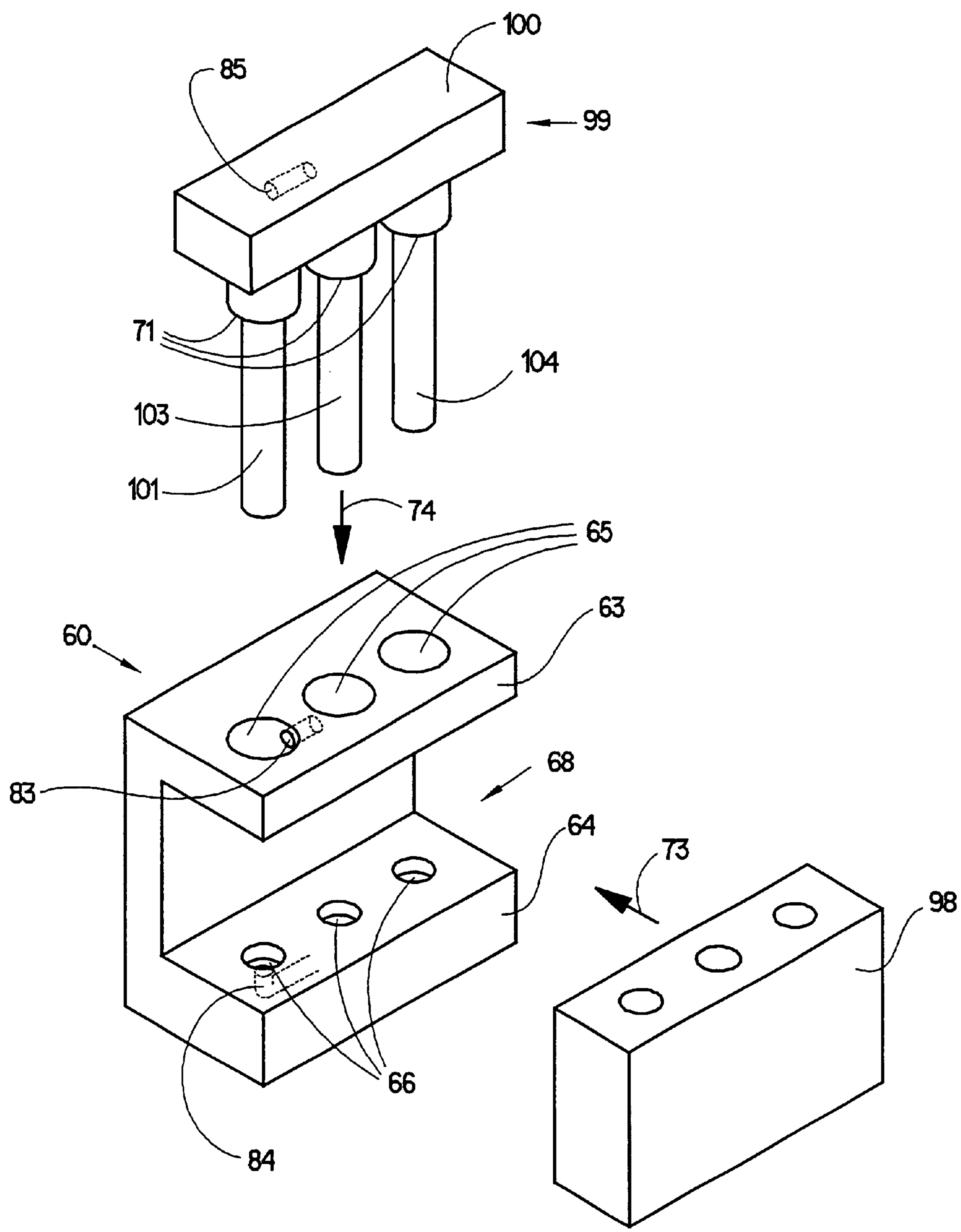
FIG. 11 shows a pre-engagement unit with a triple valve cartridge unit and triple magnet coil unit in accordance with the invention.

FIG. 11 depicts an assembly configuration for a pre-engagement unit, such as that shown in the schematics of FIGS. 1 and 2. In this configuration, the previously described magnet coil unit 61 has been incorporated into a compact triple magnet coil unit 98, which can accommodate three corresponding solenoid valves. This is achieved through the design of reduced-size solenoid valves, as explained previously, which can function with smaller magnet coils.

Because of the identical internal structure of the three cartridge solenoid valves, they can be assembled into a compact triple valve cartridge unit 99.

It should be noted that a triple valve cartridge unit is based on a pneumatic circuit that consists in this case of 3 solenoid valves. Moreover, it is essential that a multiple valve cartridge unit can be designed for all types of pneumatic circuits that utilize more than one solenoid valve, using the type of assembly configuration shown in FIG. 11. In like manner, it is also possible to design a multiple magnet coil unit to fit the multiple valve cartridge unit.

The triple valve cartridge unit 99 in FIG. 11 is based on the circuit of FIG. 2, where the 3/2-way solenoid valve 21 is designated as the valve cartridge 101 (FIG. 11), the normally open 2/2-way solenoid valve 22 of FIG. 2 is designated as the valve cartridge 103 (FIG. 11), and the normally closed 2/2-way solenoid valve 23 of FIG. 2 is designated as the valve cartridge 104 (FIG. 11). The valve cartridges 101, 103, and 104 are identical with respect to their mechanical aspects, and are of the type shown in FIG. 5. As such, the respective cylinder steps 71 shown in FIG. 11 exert a force on the triple magnet coil unit 98 in the direction of a second assembly direction 74, and thereby fix the unit 98 in its position.

In the embodiment shown in FIG. 11, the housing 60 is modified in such manner that three first bores 65 are provided in the first forked flange 63, three second pocket bores 66 are provided in the second forked flange 64, and the block-shaped opening 68 is enlarged to receive the triple magnet coil unit 98.

To assemble the pre-engagement unit of FIG. 11, the triple magnet coil unit 98 is loosely positioned in a first assembly direction 73 within the block-shaped opening 68 of the housing 60. Then, the triple valve cartridge unit 99 is inserted into the housing 60 via the bores 65 in the second assembly direction 74.

The head element 100 of the triple valve cartridge unit 99 is then connected to the forked flange 63 in a non-positive or interlocking manner, thereby fixing the triple magnet coil unit 98 within the block-shaped opening 68 of the housing 60. A fixing means, such as 109 in FIG. 12 (to be described below), is used to make this connection. The basic positions of the first, second and third housing-pressure medium terminals 83, 84, 85, respectively, previously described in FIG. 7, are depicted in FIG. 11 as required for a 3/2-way solenoid valve cartridge, such as 101. These housing-pressure medium terminals point in the direction of the other valve cartridges 103 and 104, so that pneumatic channels can be formed in the triple valve cartridge unit 99 and in the housing 60, in the same manner as the channels of the solenoid valves 21, 22 and 23, in the pneumatic circuit of FIG. 2. This type of channel arrangement is basically described in FIG. 3 for the pneumatic circuit of FIG. 1, and the channels for a circuit according to FIG. 2 can be laid out in the same manner.

Figure 12:
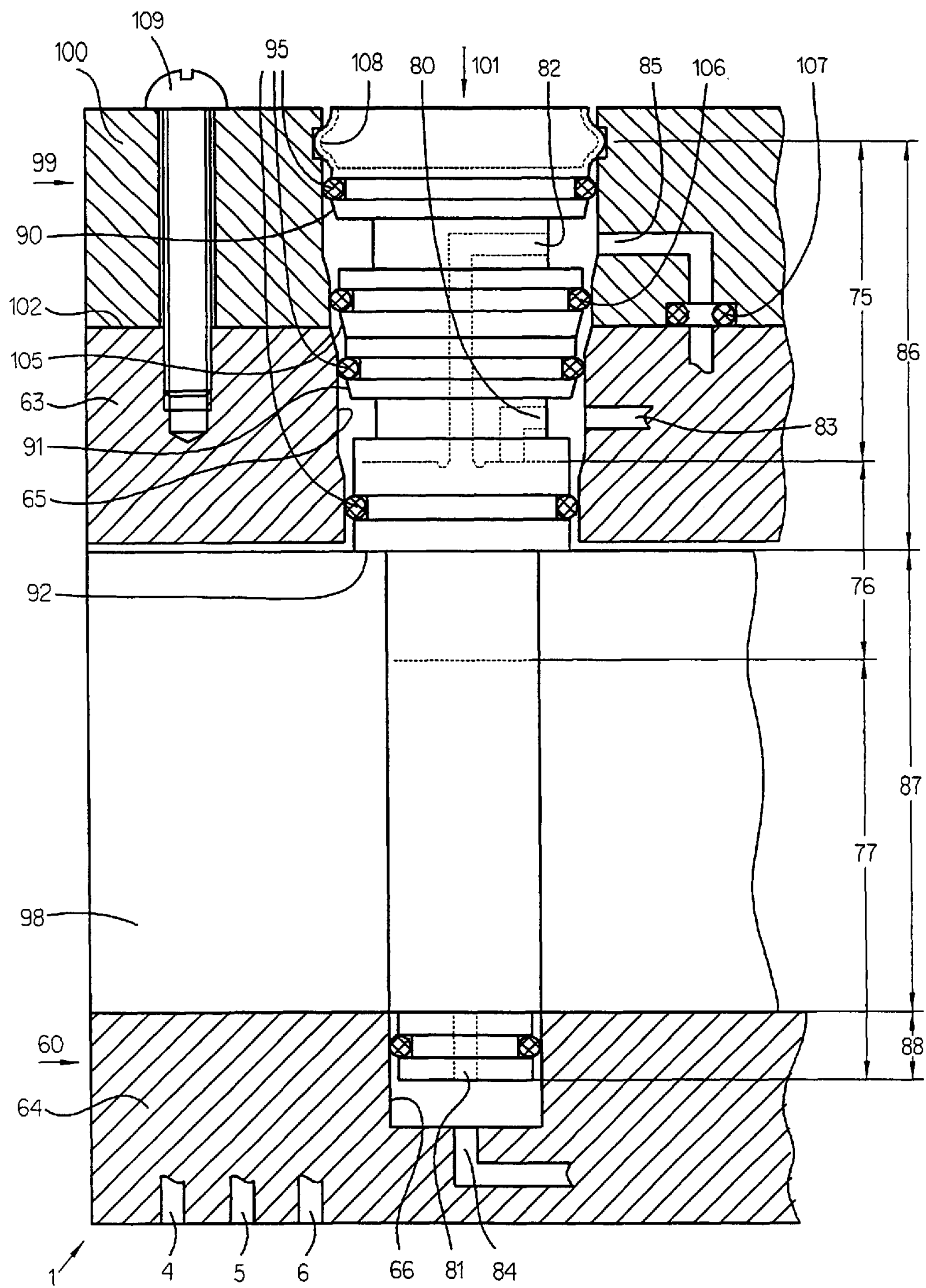
FIG. 12 shows a section through a valve cartridge of the pre-engagement unit in FIG. 11.

FIG. 12 represents the channel configuration of a 3/2-way solenoid valve cartridge 101 of the type shown in FIG. 10.

In FIG. 10, a parting line 102 is shown by broken lines and delineates the portion of the forked flange 63 of the housing 60 that is uppermost in the drawing. This portion of forked flange 63 can be separated along the parting line 102 to form the head element 100, as shown in FIG. 12. A head element 100 formed in this manner (see also FIG. 11), contains the third housing-pressure medium terminal 85, for the third cartridge-pressure medium terminal 82.

FIG. 12 illustrates a section through part of the pre-engagement unit 1 to show the pressure medium terminals of the valve cartridge 101 and their associated channels. For simplicity, the triple magnet coil unit 98 and the 3/2-way solenoid valve cartridge are not shown cut away in the drawing.

In addition to the above described change in the forked flange 63, changes must also be made to the 3/2-way solenoid valve cartridge 101 in order to form the head element 100. As shown in FIG. 11, the valve cartridge 101 is connected to the head element 100. In the illustrative embodiment of FIG. 12, this connection is made by means of a crimping 108. With this interlocking connection, it is necessary to seal off the pressure chamber formed on the third cartridge-pressure medium terminal 82 against the atmosphere. For this purpose, a grooved depression 106, for the pre-assembly of sealing O-rings, is provided, in addition to the three grooved depressions 95 shown in FIG. 10. Accordingly, a beveled valve step 105 (FIG. 12) is inserted between the first and the second beveled valve steps 90 and 91.

It is advantageous to design the channels for the connections between the housing-pressure medium terminals of the solenoid valve cartridges 101, 103, 104 (FIG. 11) in such manner that the major portion of channel connections is established in only one separate unit. Since only one terminal, i.e., third housing-pressure medium terminal 85 (FIG. 12), is provided for the 3/2-way solenoid valve cartridge 101 in the head element 100, it is advantageous to connect this terminal via the channel guide shown, and via the sealing O-ring 107, in the event that the head element 100 is attached through the fixing means 109 to the housing 60. As such, channels exist in the housing 60 for all the cartridge-pressure medium connections of the valve cartridges 101, 103 and 104 of the pre-engagement unit 1 (FIGS. 11 and 12).

It should also be noted that the parting line 102 of FIG. 10 could have been displaced in the direction of the magnet coil 38, so that, e.g., the first housing-pressure medium terminal 83 would be assigned to the head element 100. With this configuration, the channel tubings would be more expensive than for the design shown in FIG. 12, since the first housing-pressure medium terminal 83 would have to be connected via a sealing means to the housing 60. For this reason, the separation along the parting line 102, as shown in FIG. 10, represents an optimal solution from the point of view of simple tubings.

With reference to FIGS. 10, 11, and 12, channels are formed within the housing 60, which represent a channel circuit of the solenoid valve cartridges 101, 103, 104, in accordance with the pneumatic circuit of FIG. 2. The channel tubings of this pneumatic circuit are advantageously designed so that the first pneumatic inlet 4, the second pneumatic inlet 5, and the pneumatic output terminal 6 of this pre-engagement unit large brought out at suitable points of the housing 60 (FIGS. 10–12) for the external connections.

Since the pre-engagement unit 1 of FIG. 2 is connected directly to the relay valve 2, which has a pneumatic connection to the pressure supply, it is advantageous to bring out the supply pressure inlet 4 and the pneumatic output terminal 6 at one point, so that an air transfer to the corresponding pressure channel can be established. A sealing connection between the relay valve 2 and the pre-engagement unit 1, whereby the pneumatic terminals 4 and 6 are sealingly connected to the relay valve 2, can, e.g., be effected in the same manner in which the third housing-pressure medium terminal 85 is connected to the housing 60 via the O-ring 107 (FIG. 12).

To complete the pneumatic supply channels of FIG. 2, the redundancy pressure is connected at the second pneumatic inlet 5 of the pre-engagement unit 1, in conjunction with the relay valve 2.

In addition to the previously described pre-engagement unit of FIG. 11, based on the fixing manner of the valve cartridge in FIG. 5, it is also possible to build a pre-engagement unit in which a triple valve cartridge unit is provided, with the individual valve cartridges designed to correspond to the magnet coil fixing system of FIG. 6. Since these valve cartridges have the form of a straight cylinder with a circular cross-section, there is no necessity in such an embodiment to form a head element that rigidly combines the different valve cartridges.

Instead, by utilizing the fixing system of FIG. 6, the three individual valve cartridges can be held together by, e.g., one elastic clasp in a loose triple valve cartridge unit. With the insertion and fixing of the individual valve cartridges in the manner shown in FIG. 6, the pre-engagement unit is complete. Finally, the channel tubings to connect the housing-pressure medium terminals of these valve cartridges can be designed in basically the same manner as described for FIG. 12.

While the invention has been described by reference to specific embodiments, this was for purposes of illustration only. Numerous alternative embodiments will be apparent to those skilled in the art and are considered to be within the scope of the invention.

What is claimed is:

1. A valve system having at least one solenoid valve for a pre-engagement unit of a braking pressure modulator, comprising:

a) a one-piece housing, in which a square-shaped opening forms a first forked flange and a second forked flange;

b) a first bore in said first forked flange and a second pocket bore in said second forked flange, wherein a central line of said first bore is coaxial with a central line of said second pocket bore;

c) a magnet coil, having an opening in the form of a straight circular cylinder through the magnet coil, said magnet coil being designed so that it can be positioned within said square-shaped opening of said housing;

d) a valve cartridge in the form of a cylinder with circular cross-section, said valve cartridge being configured so that it can be inserted into said housing, from said first bore in the direction of said second pocket bore, wherein said magnet coil positioned in said housing opening can only be displaced in an axial direction; and e) at least one pressure medium terminal connected to at least one of said forked flanges.

2. The valve system of claim 1, wherein said valve cartridge comprises a straight stepped cylinder with circular cross-section, and having at least one step.

3. The valve system of claim 1, wherein the axial position of said magnetic coil within said housing is fixed as a result of fixing said valve cartridge after it has been inserted into said housing.

4. The valve system of claim 1, further comprising additional means for fixing the axial position of said magnet coil within said housing with respect to said valve cartridge after it has been inserted into said housing.

5. The valve system of claim 1, wherein said valve system comprises a pre-engagement unit for a braking pressure modulator for at least one pressure regulating circuit of an electronic braking system.

6. The valve system of claim 5, wherein said preengagement unit comprises:

f) a first pneumatic inlet through which a supply pressure is supplied to said pre-engagement unit;

g) a second pneumatic inlet through which a redundancy pressure is supplied to said pre-engagement unit, said redundancy pressure being derived from the braking pressure of said electronic braking system;

h) a pneumatic output terminal through which said pre-engagement unit is connected to an air quantity augmenting valve system;

i) an electrically actuated valve system having pneumatic terminals which are interconnected, and having electrical terminals which are connected to the output terminals of an electronic control system; and j) said electrically actuated valve system further comprising three 2/2-way cartridge solenoid valves, each having a first and a second pneumatic terminal.

7. The valve system of claim 6 wherein said pre-engagement unit comprises a multiple valve cartridge unit comprising said three 2/2-way cartridge solenoid valves.

8. The valve system of claim 7 wherein said pre-engagement unit comprises a head element connected to the individual cartridge solenoid valves of said multiple valve cartridge unit.

9. The valve system of claim 7 wherein said cartridge solenoid valves include magnet coils which are configured as multiple magnet coil units which fit into the square-shaped opening of said housing of said pre-engagement unit.

10. The valve system of claim 9, wherein said multiple magnet coil units are assembled together as an extrusion coated multiple magnet coil unit.

11. The valve system of claim 6, wherein said three 2/2-way cartridge solenoid valves are connected in parallel to each other.

12. The valve system of claim 6, wherein said three 2/2-way cartridge solenoid valves are operated in a pulsating mode.

13. The valve system of claim 6, wherein said three 2/2-way cartridge solenoid valves comprise:

k) a first 2/2-way solenoid valve is closed in its unactuated state and serves as an air admission valve for the supply pressure to said pressure regulating circuit;

l) a second 2/2-way solenoid valve is open in its unactuated state and serves as an air admission/exhaust valve for the redundancy pressure to said pressure regulating circuit; and m) a third 2/2-way solenoid valve is closed in its unactuated state and serves as an air exhaust valve for said pressure regulating circuit.

14. The valve system of claim 13, wherein:

n) a first pneumatic terminal of said first 2/2-way solenoid valve is connected to said first pneumatic inlet of said pre-engagement unit, and a second pneumatic terminal of said first 2/2-way solenoid valve is connected to said pneumatic output terminal of said pre-engagement unit;

o) a first pneumatic terminal of said second 2/2-way solenoid valve is connected to said second pneumatic inlet of said pre-engagement unit, and a second pneumatic terminal of said second 2/2-way solenoid valve is connected to said pneumatic output terminal of said pre-engagement unit; and p) a first pneumatic terminal of said third 2/2-way solenoid valve is connected to said pneumatic output terminal of said pre-engagement unit, and a second pneumatic terminal of said third 2/2-way solenoid valve is connected to a pressure sink.

15. The valve system of claim 1 wherein said pre-engagement unit comprises:

f) a first pneumatic inlet through which a supply pressure is supplied to said pre-engagement unit;

g) a second pneumatic inlet through which a redundancy pressure is supplied to said pre-engagement unit, said redundancy pressure being derived from the braking pressure of said electronic braking system;

h) a pneumatic output terminal through which said pre-engagement unit is connected to an air quantity augmenting valve system;

i) an electrically actuated valve system having pneumatic terminals which are interconnected, and having electrical terminals which are connected to the output terminals of an electronic control system;

j) a 3/2-way cartridge solenoid valve acting as a redundancy valve;

k) a normally open 2/2-way cartridge solenoid valve acting as an air admission valve; and l) a normally closed 2/2-way cartridge solenoid valve acting as an exhaust valve.

16. A valve system, having at least one solenoid valve cartridge and an associated magnet coil, wherein said magnet coil actuates said solenoid valve, and wherein said solenoid valve cartridge comprises:

a) three individual cylindrical bodies, designated as first, second and third cylinder bodies in a predetermined assembly direction, connected in series along their respective longitudinal axes, wherein said three cylinder bodies are configured as circular round cylinders;

b) said three cylinder bodies, each having a first end and a second end in said assembly direction, are connected end-to-end so that their respective cylinder diameters decrease in said assembly direction;

c) said second end of said first cylinder body is connected to said first end of said second cylinder body, and said second end of said second cylinder body is connected to said first end of said third cylinder body in such manner that said three cylinder bodies become an integral unit;

d) said first and second cylinder bodies are comprised of a non-magnetic material;

e) said third cylinder body comprises a ferromagnetic material;

f) said second cylinder body is hollow, and contains an armature and an armature return device, wherein said armature presses against said second end of said first cylinder body when there is no current flowing in said magnet coil, and when there is current flowing in said magnet coil, the resultant magnetic field causes said armature to press against said first end of said third cylinder body;

g) said second end of said first cylinder body representing a first valve lift stop of said armature, and said first end of said third cylinder body representing a second valve lift stop.

17. The valve system of claim 16, wherein said solenoid valve cartridge further comprises pressure medium terminals which are connected to said solenoid valve cartridge, the type and number of said pressure medium terminals being determined by the type of said solenoid valve cartridge.

18. The valve system of claim 17 wherein said solenoid valve cartridge has the following characteristics:

j) said solenoid valve cartridge is subdivided into first, second, and third cartridge functional zones;

k) said first cartridge functional zone extends from said first end of said first cylinder body into that portion of said second cylinder body which is located outside the influence of said magnetic field;

l) said second cartridge functional zone extends from the end of said first cartridge functional zone through that portion of said third cylinder body that is within the influence of said magnetic field;

m) said third cartridge functional zone extends from the end of said magnetic field influence to said second end of said third cylinder body;

n) said first cartridge functional zone including at least one pressure medium terminal.

19. The valve system of claim 18, wherein said first and third cartridge functional zones determine the axial position alignment of said solenoid valve cartridge within said housing.

20. The valve system of claim 18 wherein:

p) said armature includes an elastomer insert to constitute a hermetically sealing valve seat at said first valve lift stop;

q) said armature includes a surface at said second valve lift stop to form a non-hermetically sealing metal-to-metal valve seat.

21. The valve system of claim 18, wherein said third cartridge functional zone includes an additional pressure medium terminal.

22. The valve system of claim 16 which comprises a part of a pre-engagement unit for a braking pressure modulator for at least one pressure regulating circuit of an electronic braking system.

23. The valve system of claim 22 wherein said solenoid valve cartridge comprises a 2/2-way cartridge solenoid valve.

24. The valve system of claim 23 wherein said solenoid valve cartridge comprises a normally open solenoid valve cartridge.

25. The valve system of claim 23 wherein said solenoid valve cartridge comprises a normally closed solenoid valve cartridge.

26. The valve system of claim 22 wherein said solenoid valve cartridge is comprises as a 3/2-way cartridge solenoid valve.

27. The valve system of claim 22 wherein said armature is of identical construction whether used for a 2/2-way cartridge solenoid valve or for a 3/2-way cartridge solenoid valve.

28. The valve system of claim 16, wherein said three cylinder bodies are configured as circular round stepped cylinders.

29. The valve system of claim 16, wherein the respective cylinder diameters of said three cylinder bodies remain constant in said assembly direction.

30. The valve system of claim 16, wherein said second end of said first cylinder body is equipped with a sealing seat.

31. The valve system of claim 16, wherein said second end of said first cylinder body is equipped with an armature stop.

32. The valve system of claim 16, wherein said first end of said third cylinder body is equipped with a sealing seat.

33. The valve system of claim 16, wherein said first end of said third cylinder body is equipped with a armature stop.

* * * * *

UNITED STATES PATENT AND TRADEMARK OFFICE
CERTIFICATE OF CORRECTION

PATENT NO. : 6,453,936 B1
DATED : September 24, 2002
INVENTOR(S) : Dieter Frank et al.

It is certified that error appears in the above-identified patent and that said Letters Patent is hereby corrected as shown below:

Title page,
Item [75], the last name of the second inventor should read -- Schreiber --

Signed and Sealed this

Second Day of September, 2003

JAMES E. ROGAN
*Director of the United States Patent and Trademark Office*